(12) United States Patent
Nellen (10) Patent No.: US 8,579,366 B2
(45) Date of Patent: Nov. 12, 2013

(54) SUNSHADE ASSEMBLY AND OPEN ROOF CONSTRUCTION PROVIDED THEREWITH

(75) Inventor: Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/402,227

(22) Filed: Feb. 22, 2012

(65) Prior Publication Data
US 2012/0212011 A1 Aug. 23, 2012

(30) Foreign Application Priority Data
Feb. 23, 2011 (EP) .................................. 11155664

(51) Int. Cl.
*B60J 7/00* (2006.01)
*B60J 7/043* (2006.01)

(52) U.S. Cl.
USPC ....................................................... 296/214

(58) Field of Classification Search
USPC ......................................................... 296/214
See application file for complete search history.

(56) References Cited

U.S. PATENT DOCUMENTS

| | | | | |
|---|---|---|---|---|
| 3,051,232 A | * | 8/1962 | Lamb | 160/368.1 |
| 3,979,782 A | * | 9/1976 | Lamb | 4/502 |
| 5,953,875 A | * | 9/1999 | Harkins | 52/407.3 |
| 2004/0094993 A1 | * | 5/2004 | Jans | 296/214 |
| 2004/0160082 A1 | | 8/2004 | Bohm et al. | 296/97.11 |
| 2009/0145559 A1 | * | 6/2009 | Glasl et al. | 160/273.1 |

FOREIGN PATENT DOCUMENTS

| | | |
|---|---|---|
| EP | 177090 A2 | 4/2007 |
| EP | 1880885 A1 | 1/2008 |
| EP | 2230115 A1 | 9/2010 |

OTHER PUBLICATIONS

PCT Search Report for EP11155664, Apr. 8, 2011.

* cited by examiner

*Primary Examiner* — Dennis Pedder
(74) *Attorney, Agent, or Firm* — Steven M. Koehler; Westman, Champlin & Koehler, PA (57) ABSTRACT

A sunshade assembly includes opposed longitudinal edges and opposed transversal edges. The longitudinal edges are adapted to be guided in non parallel guide rails. The sunshade assembly comprises a flexible screen, said screen having a transversal edge connected to a beam of the sunshade assembly and having opposed lateral screen parts biased in lateral direction. At least one of the lateral screen parts is configured to adjustably fold around a folding member through an angle of substantially 180° along at least a part of the length of the corresponding longitudinal edge of the sunshade assembly. The invention is useful for several types of sunshade assembly, such as roller screens and sunshade panels.

22 Claims, 6 Drawing Sheets

SUNSHADE ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Aspects of the present invention relate to a sunshade assembly having opposed longitudinal edges and opposed transversal edges, the longitudinal edges being adapted to be guided in non parallel guide rails, the sunshade assembly comprising a flexible screen, said screen having a transversal edge connected to a beam, and having opposed lateral screen parts biased in lateral direction.

A sunshade assembly known from the prior art is EP 2 230 115 A1. This sunshade assembly has a cloth, which is movable and guided in guide rails, between a wound and unwound position. Said guide rails are non parallel with respect to each other. A triangular flexible lateral element in the form of a lateral rollo blind is connected between the main cloth and one of the guide rails. In an unwound position of the main sunshade assembly, the lateral rollo blind is unwound and covers a lateral triangular area. When the sunshade assembly is wound, the lateral rollo blind is wound as well.

This prior art sunshade assembly solves the guiding problem of a sunshade assembly that has non parallel guide rails, however is rather complex in its functionality and it needs numerous parts for storing the lateral triangular areas of cloth.

In general it is required that the cloth, and especially said lateral triangular parts are kept taut, without any wrinkles.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A sunshade assembly according to an aspect of the invention has at least one of said lateral screen parts configured to adjustably fold around a folding member through an angle of substantially 180° along at least a part of the length of the corresponding longitudinal edge of the sunshade assembly. The extreme ends of the lateral parts folded around the folding members are biased in lateral direction, so as to keep the screen taut across its lateral width.

In one embodiment the lateral screen parts of the flexible screen are each folded around a folding member which is a wire. Said wire may be positioned in or in the vicinity of the longitudinal guide rails and is kept taut in a longitudinal direction, for example by tensioning it between a rollo shaft or rollo reel and a rollo beam, or in any other way known per se.

To facilitate the lateral movement of the lateral screen parts around the wire, the wire may be equipped with a sleeve, which could be made of plastic, or any other suitable material.

It is conceivable that the folding member is configured as a bending resistant rod, preferably made of steel or any other suitable material. Said rod is stationary and may be connected to a stationary member of the open roof construction, for instance to the respective guide rail on a first end, and to another stationary member on the other end. It is also conceivable that only one end of the rod is supported by the stationary member of the open roof construction. The longitudinal shape of each rod substantially corresponds to that of the respective guide rail.

In another embodiment, the sunshade assembly comprises a substantially rigid center member and two opposed rigid lateral members, said lateral members are pivotally connected with the center member in an area near a first transversal edge, and are connected to a guiding member in the respective guide rail near a second transversal edge. Said center member is also guided in the guide rail by a guiding member. The screen is folded around each of the lateral members, whereby the area of the lateral members adjacent to the screen have a rounded shape suitable to smoothly fold the lateral screen parts and guide their movements.

A biasing element keeps the lateral screen parts taut in lateral direction, whereby the biasing element may be a separate part made of flexible and elastic material, sufficient to keep the screen taut, but also capable of being wound on a rollo shaft in case the sunshade assembly is a roller screen. Said elastic member is connected on a first end to one of said lateral screen parts and on a second end to the opposite lateral screen part, or said second end may be connected to the upper side of the flexible screen, or to the center member, said second may also be connected to a beam, said beam forms a transversal edge of the sunshade assembly.

In another embodiment the area of the folding member engaging the screen is covered with a friction reducing coating. This facilitates movements of the lateral screen parts with respect to the folding members.

In yet another embodiment the screen and the lateral screen parts may be made of different materials fixed, for example, stitched together, whereby the lateral screen parts may be made of an elastic material. It is also conceivable that said elastic flexible screen parts are biased in lateral direction and are connected to the upper side of the screen directly, thus avoiding a separate elastic member.

BRIEF DESCRIPTION OF THE DRAWINGS

Hereinafter aspects of the invention will be further elucidated with reference to the drawing schematically showing embodiments of the invention by way of example.

DETAILED DESCRIPTION OF THE ILLUSTRATIVE EMBODIMENTS

Figure 1:
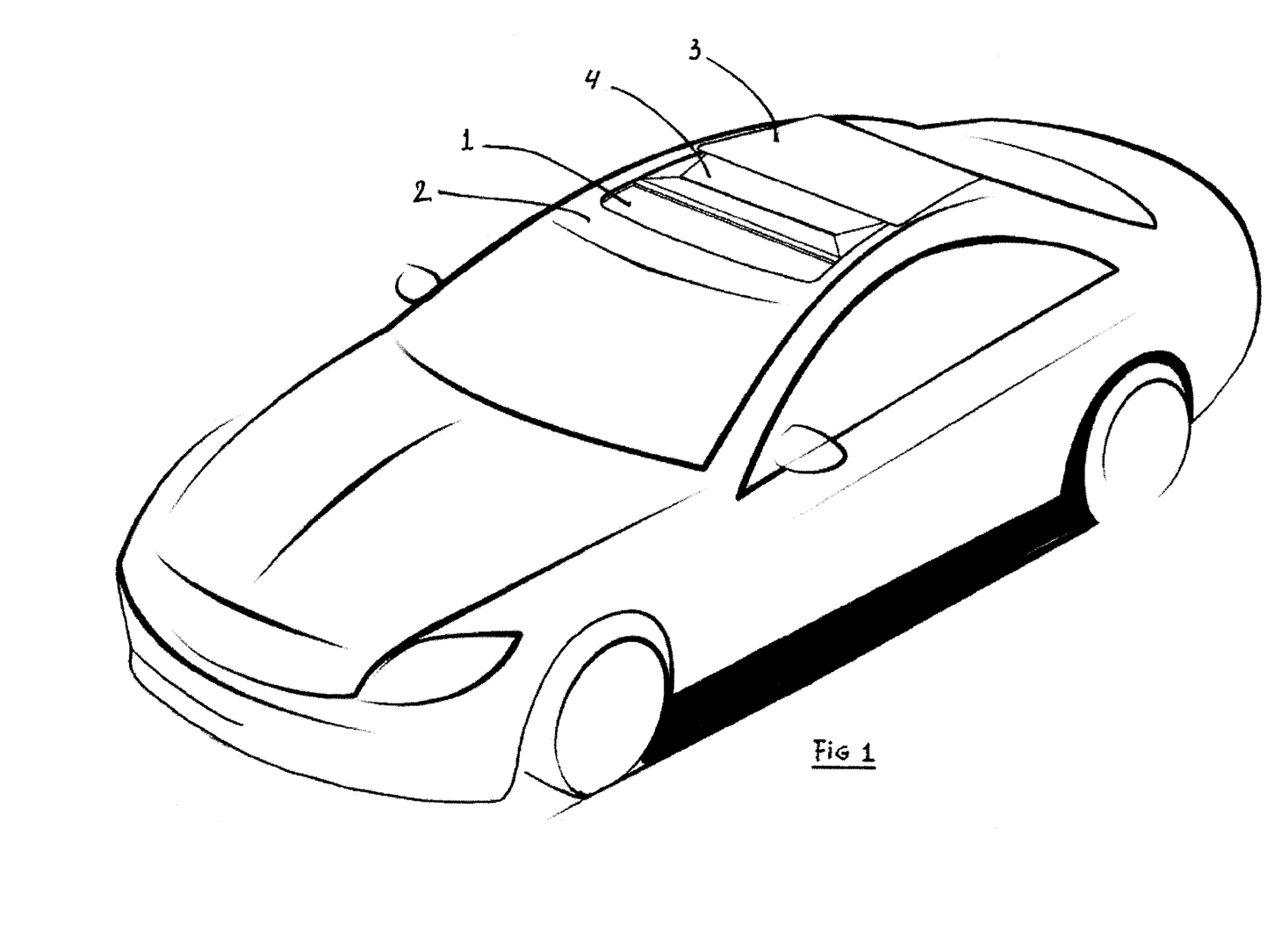
FIG. 1 is a schematic perspective view of a vehicle having an open roof construction in its roof.

Referring to FIG. 1, a vehicle having an open roof construction in its roof is illustrated schematically. Said open roof construction comprises a roof opening 1 in a stationary roof part 2 of the vehicle, such as a passenger car, and a movable closure, for example a panel 3 which, by means not illustrated but known per se, can be moved for opening and closing said roof opening 1. In the embodiment shown, the open roof construction is a so-called spoiler roof or topslider in which the panel 3 is moved from a closed position within the roof opening 1 rearwardly to an open position in which the panel is partly or completely above a roof part behind the roof opening. Other closures, such as slats, a folding member and the like are useable with aspects of the invention herein described.

Below the roof opening 1, a sunshade assembly is arranged.

Figure 2:
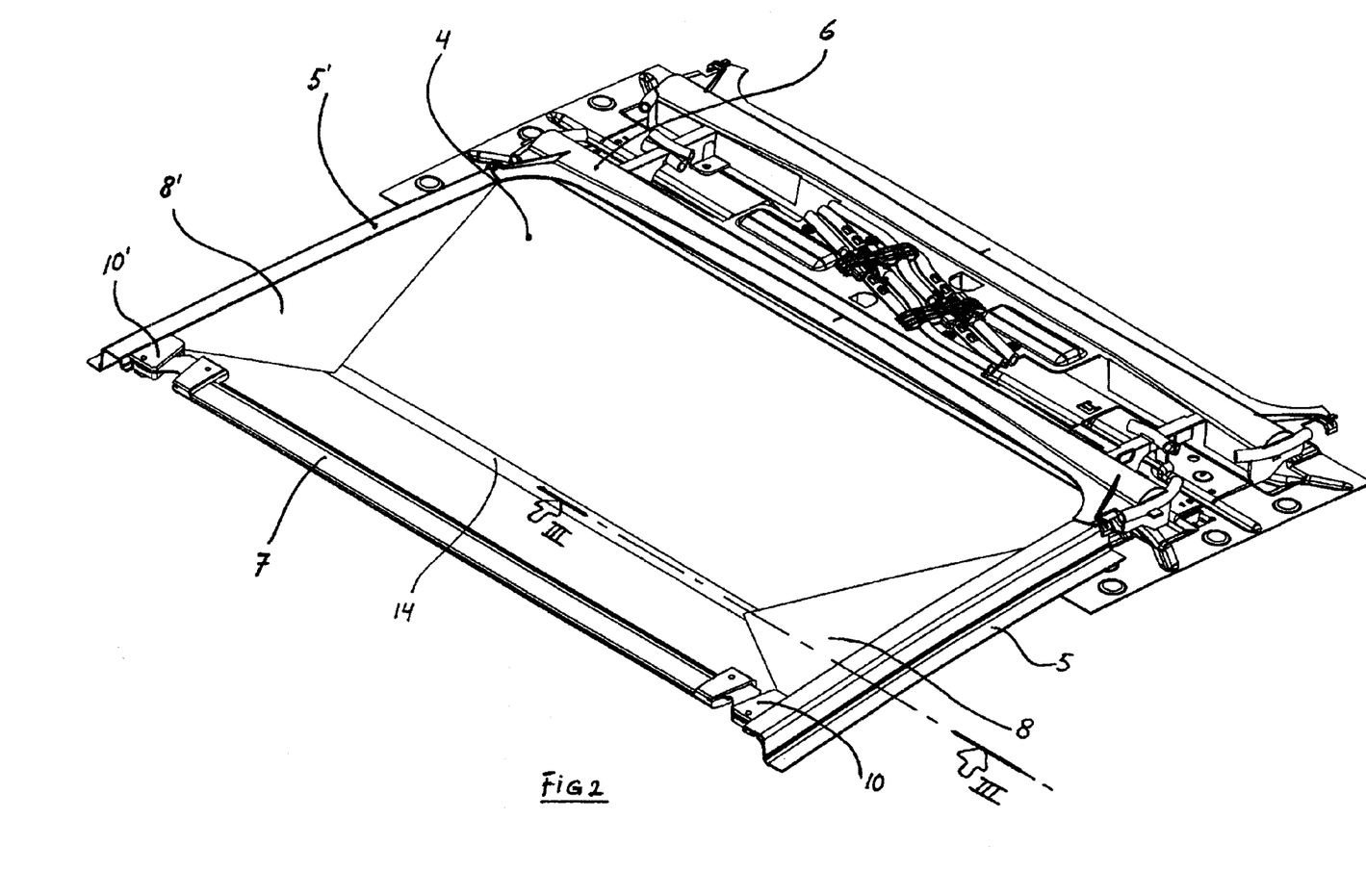
FIG. 2 is an enlarged perspective view of a first embodiment of a sunshade assembly to be used in the open roof construction of FIG. 1, formed as a windable sunshade assembly shown in an unwound position.

Referring to FIG. 2, the sunshade assembly is configured as a so called "rollo" or roller screen which comprises a flexible screen 4 having opposed longitudinal edges (extending mainly in longitudinal direction of the vehicle) and opposed transversal edges, the longitudinal edges being guided in non parallel guide rails 5, 5'. Said guide rails 5, 5' may be straight or may have a curvature individually, but are aligned towards each other in such a way that they are diverging from each other, in this case towards the front of the roof opening 1.

A first one of the transversal edges of the flexible screen 4 is connected to a rotatable winding shaft 6 configured for winding and unwinding said sunscreen, a second transversal edge being connected to a beam 7 for tensioning and unwinding said sunscreen in a longitudinal direction. Said winding shaft 6 is known per se, and is therefore not further elucidated. In FIG. 2, the sunshade assembly is shown in a rolled out or unwound condition in which it closes a passage in a frame of the open roof construction below the roof opening 1. The screen 4 is connected to the beam 7, in a way known per se, and is not further elucidated. Each end of the beam 7 has a joint with a guiding member 10, 10'. Said joint adapts to the changing distance between the non parallel guide rails 5, 5' and one end of the beam 7, 7' when the sunshade assembly is unwound, or wound. The joint might include a lever between the beam 7 and the guide member 10, 10', respectively, being pivotable on both ends to take up the distance between the guide member 10, 10' and the respective beam end by pivoting.

The changing distance between the non parallel guides 5, 5' is taken up by the screen 4 through lateral screen parts 8, 8', said parts moving in lateral direction and moving around a folding member 9A (see FIG. 3), and further in lateral direction towards the opposite guide rails 5,5' when the screen 4 is wound or unwound.

As mentioned, the sunshade assembly further comprises opposed lateral screen parts 8, 8' biased in lateral direction. Said lateral screen parts 8, 8' may be made of the same material, and may be made in one integral piece, including formed from a single unitary body, with a center part of the flexible screen 4. On the other hand, the lateral screen parts 8, 8' may be made of a different material compared to that of the center part of the flexible screen 4. It is also conceivable that the lateral screen parts 8, 8' are made of elastic materials, and be connected with the center part of the flexible screen 4 by stitching, gluing, welding or any other suitable way known per se.

Figure 3:
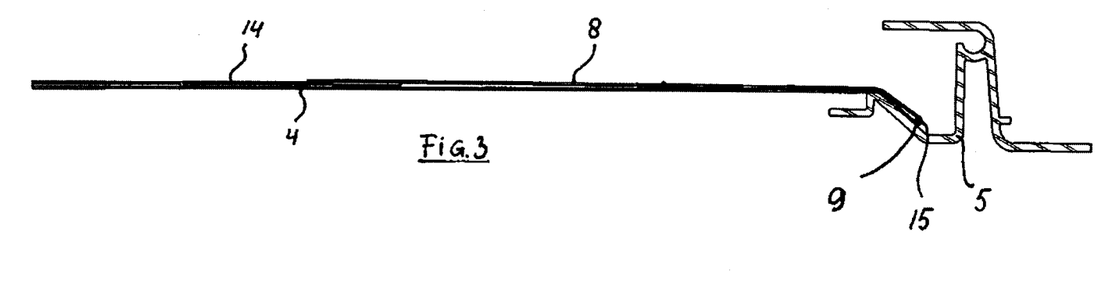
FIG. 3 is an enlarged cross-sectional view along the line in FIG. 2.

Referring to FIG. 3, portions of said lateral screen parts 8, 8' are folded around the folding member 9A, are arranged vertically above the screen 4 and are directed in a direction substantially towards the opposing folding member 9A. It is clear that in an embodiment where the folding member 9A is a wire or other flat member, as is the case in the FIG. 3 embodiment, the portion of the folded lateral screen parts 8, 8' pointing in the direction towards the opposite guide rail may lie substantially on top of and substantially in contact with the upper side of the screen 4. The lateral screen parts 8, 8' may be of a substantially triangular shape, however any other shape, for instance rectangular, or circular shapes are possible too. The folded lateral screen parts 8, 8' may thus be folded around the folding member 9A in an angle of substantially 180°, however an angle slightly smaller or bigger is possible too. In general an angle in a range between 160° and 200° would be sufficient. In order to reduce the friction between the lateral screen parts 8, 8' and the folding member or wire 9A to facilitate the lateral movement of the lateral screen part around a substantial portion of the wire 9A and along a substantial length of the longitudinal edge of the sunscreen 4, it is conceivable to have a flexible sleeve 15 around the folding member 9A, especially in case the folding member is a wire 9A or a bending-stiff rod 9B shown in FIG. 4. Such a sleeve avoids the risk of having excessive wear at the inside of the lateral screen parts 8, 8'.

The lateral screen parts 8, 8' are biased in lateral direction towards the opposite guide rail 5, 5'. The biasing force originates from an elastic member 14, which may be an elastic band, flat spring or equivalent. It is important however that the elastic member 14 has enough biasing force in lateral direction to keep the screen and its lateral screen parts 8, 8' taut across the width of opening 1. The elastic member 14 needs to be flexible to such extent that it is able to be rolled up together with the screen onto the winding shaft 6, without leaving marks on the neighboring screen material, when the rollo is unwound again.

Figure 8:
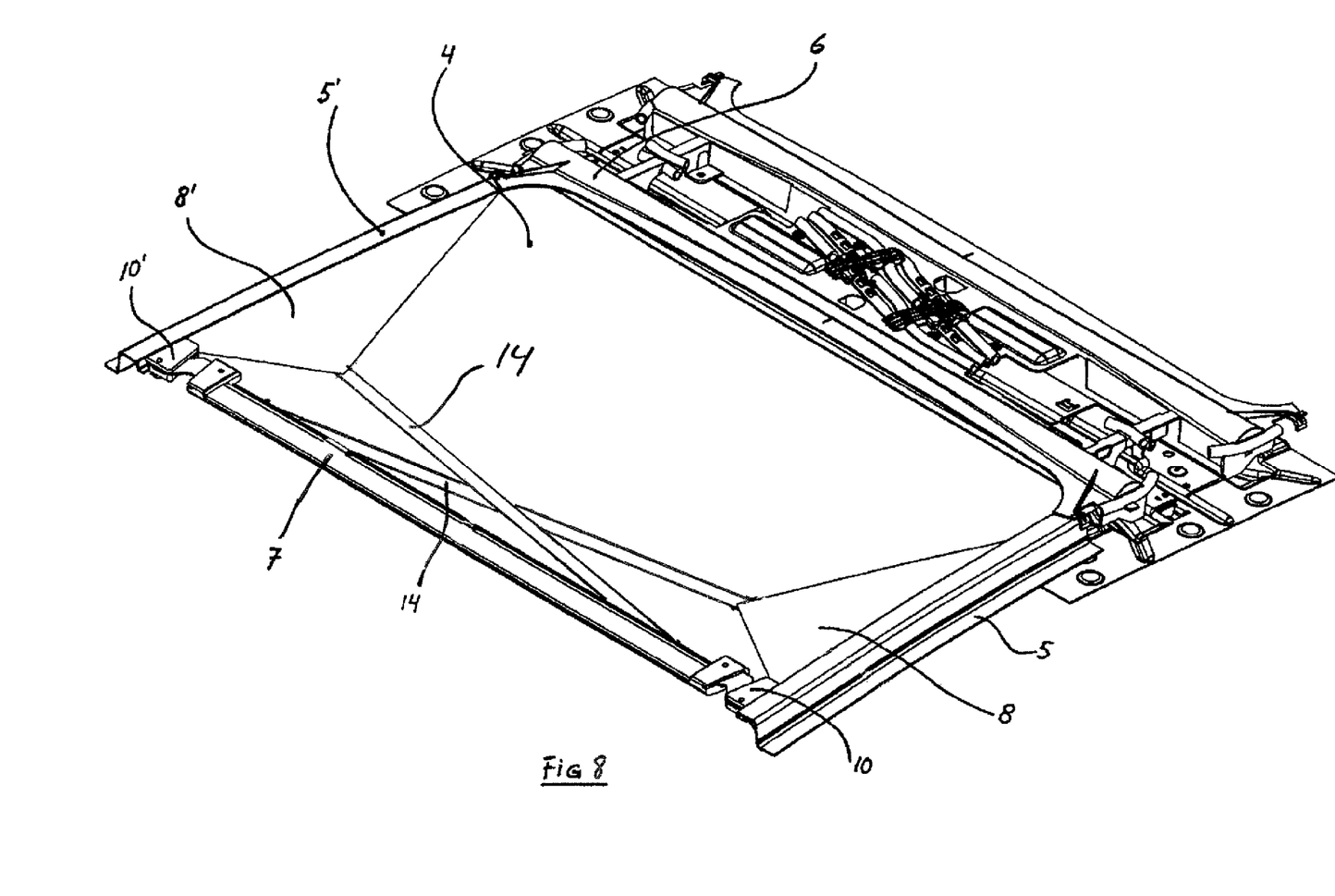
FIG. 8 is an enlarged perspective view of another embodiment of a sunshade assembly to be used in the open rood construction of FIG. 1, formed as a windable sunshade assembly shown in an unwound position.

The elastic member 14 may be connecting the two opposite lateral screen parts 8, 8', however it is also conceivable that the elastic member 14 connects each of the lateral screen parts 8, 8' with the beam 7,7' (FIG. 8) or as mentioned before connecting the lateral screen parts 8, 8' with the upper side of the screen 4. The wire 9A will generally be wound together with the screen 4, for example on a reel arranged on the winding shaft. One end of the wire 9A will therefore be attached to the reel, the other end will be attached to the guiding member 10, 10'. It will be kept taut between its ends so as to be able to withstand the tensioning force of the elastic member 14.

Figure 4:
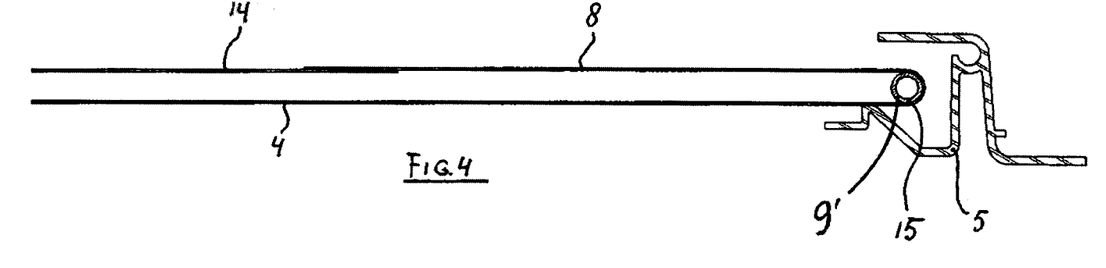
FIGS. 4 and 5 are cross-sectional views similar to that of FIG. 3, but showing other embodiments of the sunshade assembly.

Referring to FIG. 4, which also shows a sunshade assembly in the form of a rollo or roller screen, the folding member shown there is a bending stiff or rigid rod 93 in each guide rail 5, 5'. Said rod 9B is connected to a stationary member of the open roof construction, for instance to the respective guide rail on a first end, whereas on its second end said rod is also connected to the stationary member. It is also conceivable that only one end of the rod is supported by the stationary member of the open roof construction. The portion of the folded lateral screen parts 8, 8' pointing in the direction towards the opposite guide rail lies substantially above and with a certain distance to the upper side of screen 4. As the rods 9B are stationary, the lateral screen parts 8, 8' will slide with respect to the rods 9B both in longitudinal and lateral direction. The material of the lateral screen parts 8, 8' and rod 9B could be selected to obtain a low friction and/or the rod could be rotatable.

Figure 5:
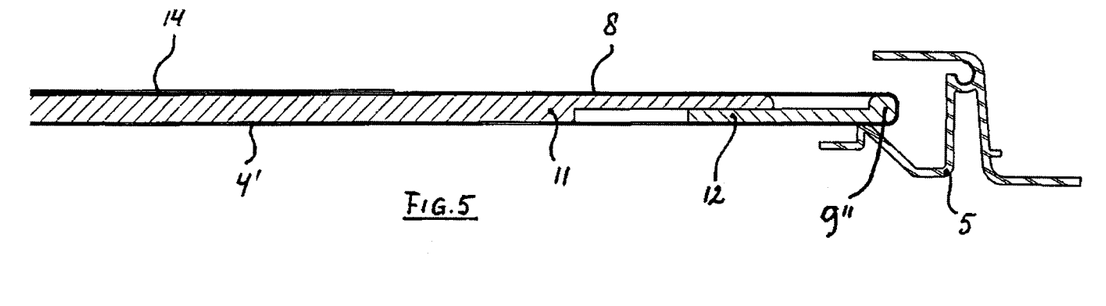
Figure 6:
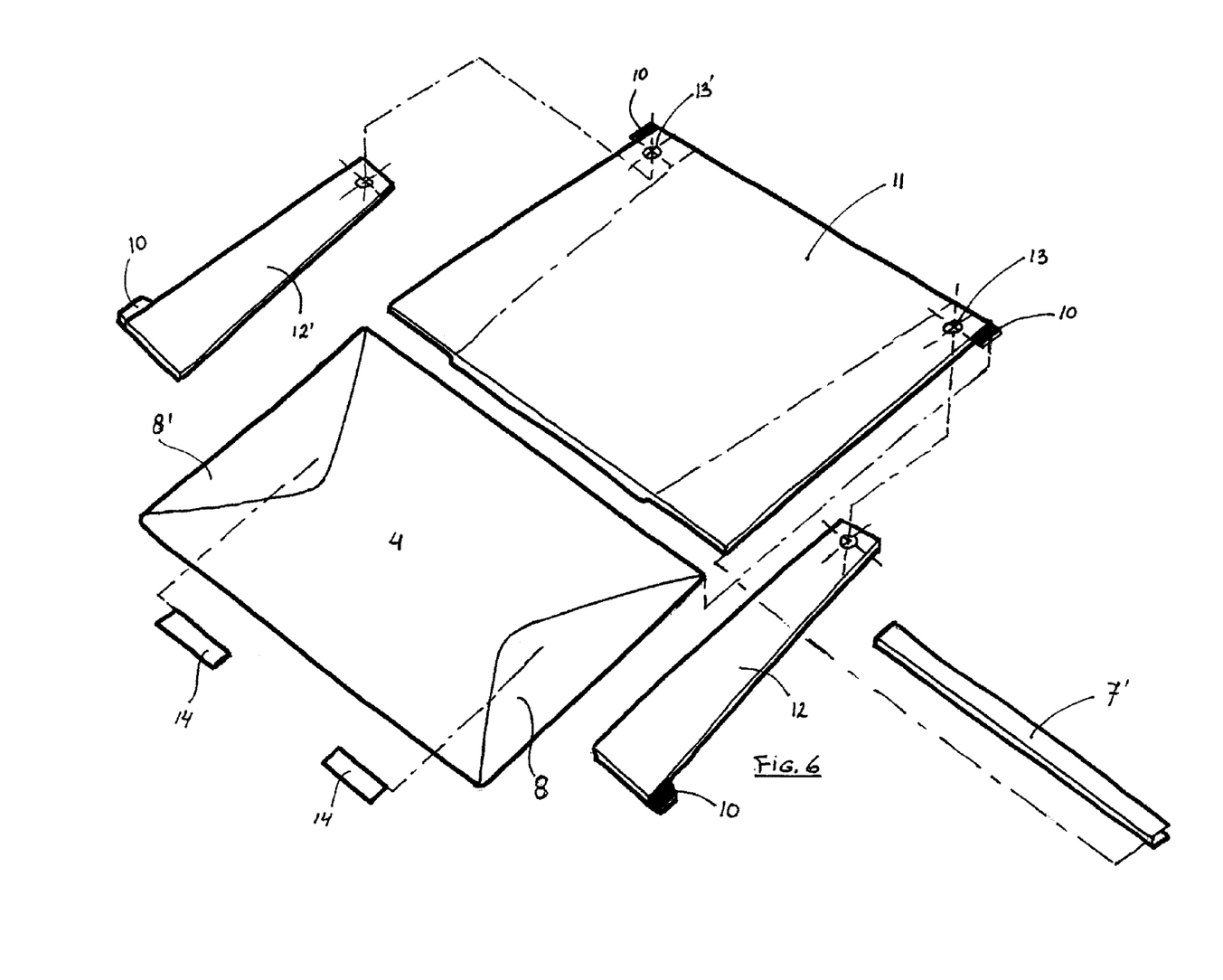
FIG. 6 is a schematic perspective exploded view of the embodiment of the sunshade assembly of FIG. 5, having a rigid center member and two separate rigid lateral member.
Figure 7:
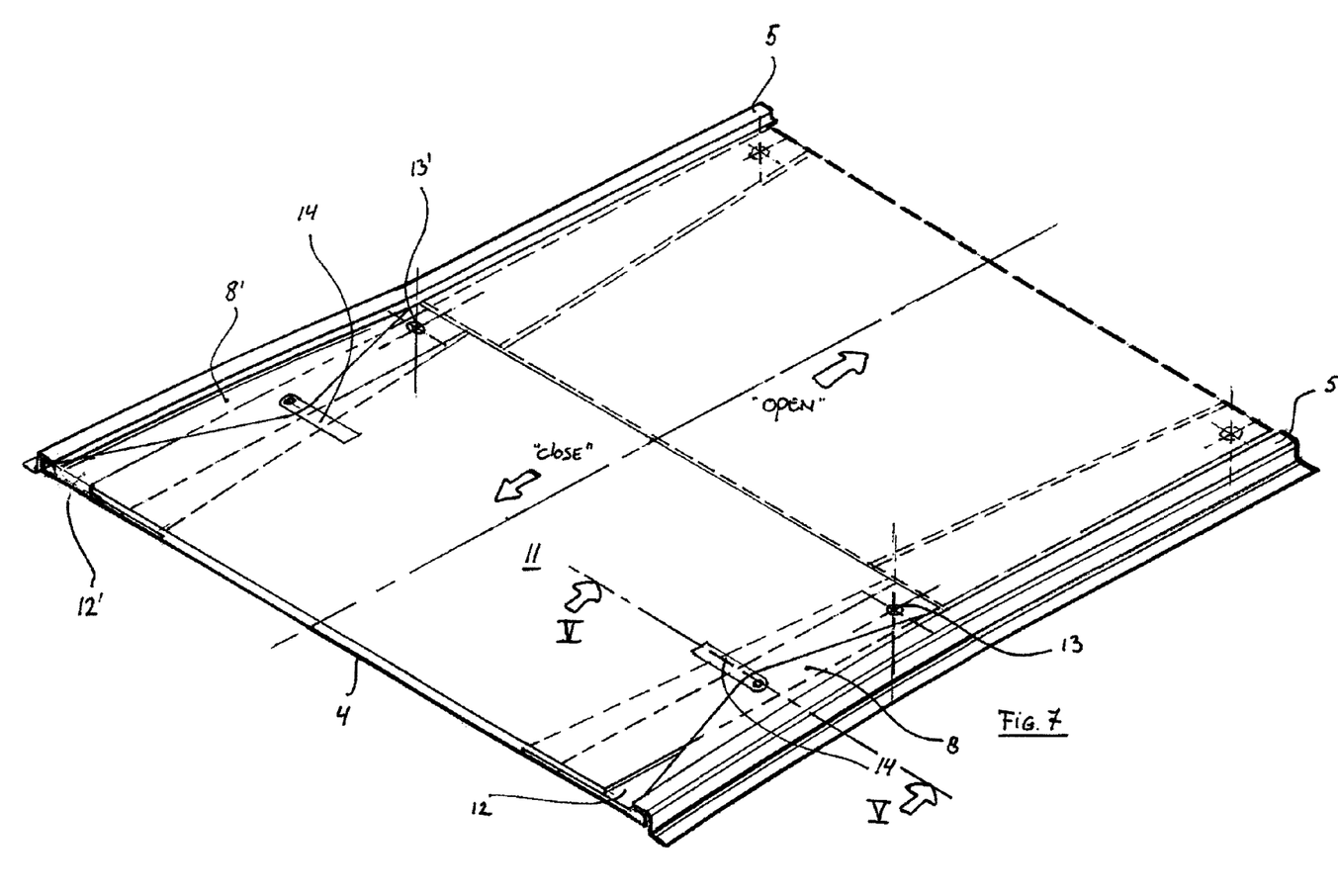
FIG. 7 is a schematic perspective view of the embodiment of FIGS. 5 and 6, wherein this embodiment is shown in two positions: a closed position in which the sunshade assembly closes at least a part of the opening of the open roof construction, indicated in solid lines, and an open position shown in dashed lines.

FIGS. 5, 6 and 7, show an embodiment of the sunshade assembly which is configured as a rigid sunshade screen or panel. It comprises a center member 11, and two opposed lateral members 12, 12' and a beam 7'. The sunshade assembly is capable of sliding at each of the opposed longitudinal edges in a pair of opposed lateral guide rails 5, 5'. Since the guide rails 5, 5' are non-parallel relative to each other, the lateral width between the longitudinal edges of the sunshade assembly varies from a condition in which the width is of a certain minimal dimension, there where the distance between the guide rails 5, 5' is smallest, to a condition in which said width has reached a maximum dimension, there where the distance between the guide rails 5, 5' is biggest.

To accommodate the difference in width the sunshade has a center member 11, and two lateral members 12, 12' pivotally connected therewith by means of pivot members 13, 13'. Each of the lateral members 12, 12' has at least two guiding members 10, 10', connected therewith, directly and/or indirectly (as shown in FIG. 7). Said guiding members 10, 10' are configured to slidably support the sunshade assembly in the guide rails 5, 5'. The pivot members 13, 13' may be positioned in an area near a first transversal edge of the sunshade, usually near the transversal edge where the sunshade assembly has a minimum lateral width. Said pivot members 13, 13' are known per se, and therefore not further elucidated. The pivot members 13, 13' are oriented such that the lateral members 12, 12' pivot parallel to plane of the center member 11, and thus the pivot axis is oriented substantially perpendicularly to the plane of the center member 11. The folding member in this embodiment is a rounded portion 9C on the lateral outer side of the folding members 12, 12' where the lateral screen parts 8, 8' are folded or guided through substantially 180°, see FIG. 5.

In a situation in which the sunshade assembly slides between an "open" position and a "close" position, as shown in FIG. 7, the lateral members 12, 12' will follow the curvature of the non parallel guide rails 5, 5' due to the engagement of their guiding members 10, 10' with the guide rails 5, 5'. When doing so, each of said lateral members will rotate around pivot member 13, 13'. A screen 4 is arranged on the lower side of said center member 11, and the lateral members 12, 12', in such a way that it is adjacent to the lower surfaces of said members 11, 12, 12'. The screen 4 may be connected with the center member 11, in a way known per se. It is also conceivable that the screen 4 is not connected to the lower side of said center member 11. In relation to the lateral members 12, 12', the screen 4 is not connected to their respective lower and upper surfaces, since said member must be able to move in lateral direction. As already explained before with respect to other embodiments, the screen 4 has lateral screen parts 8, 8' which, in this embodiment, are folded around a rounded portion 9C of the lateral members 12, 12'. The lateral screen parts 8, 8' are biased above the upper surface of the center member 11 and of the lateral members 12, 12' in a direction towards the opposite guide rail 5, 5'. In this case, the lateral screen parts 8, 8' are biased by their own elastic member 14, 14' which is connected to the respective lateral screen part 8, 8' on one end and to the center member 11 on the other end. The rounded portion 9c of the lateral member 12, 12', around which the lateral screen parts 8, 8' are folded, have a typical shape so as to ensure a reduced contact area and a minimum of friction between the two parts. It is conceivable that said rounded portion 9C of said lateral member 12, 12' is coated with a coating reducing the friction between screen and member material.

It follows from the foregoing that an aspect of the invention provides a sunshade assembly that easily adapts to non parallel guide rails and nonetheless maintains an attractive appearance towards the interior of the vehicle in all circumstances.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims. In addition, features of one embodiment may be combined with features of other embodiments. For example in the embodiment of FIGS. 5-7, the guide members 10, 10' on the front of the sunshade may be movably attached to the center member 11 or the beam 7' and be movably attached to the respective lateral members 12, 12'. The center member of larger rigid sunshades may comprise several rigid parts that are interconnected in a movable manner, for example to follow curved roofs.

The invention claimed is:

1. A sunshade assembly having opposed longitudinal edges and opposed transversal edges, the longitudinal edges being configured to be guided in non parallel guide rails, the sunshade assembly comprising:
    a beam;
    a folding member;
    a flexible screen, said screen having a transversal edge connected to the beam and having opposed lateral screen parts; and
    a biasing element configured to bias at least one of said lateral screen parts in a lateral direction toward the longitudinal edge that is opposite the lateral screen part, wherein the at least one lateral screen part is configured to adjust an extent of fold around the folding member through an angle of substantially 180° along at least a part of the length of the corresponding longitudinal edge of the sunshade assembly.

2. The sunshade assembly according to claim 1, wherein that the folding member comprises a flexible wire, which is kept taut between both ends.

3. The sunshade assembly according to claim 1, and further comprising a frame, wherein the folding member comprises a bending resistant rod, connected to the frame on one end.

4. The sunshade assembly according to claim 1, wherein that the folding member is formed as a part of a lateral member.

5. A sunshade assembly having opposed longitudinal edges and opposed transversal edges, the longitudinal edges being configured to be guided in non parallel guide rails, the sunshade assembly comprising:
    a beam;
    a folding member formed as a part of a lateral member, wherein that the lateral member, on a first longitudinal end, is configured to rotate around a pivot member connected to a center member, and, on a second longitudinal end, being guided in lateral direction by a guiding member in the guide rail; and
    a flexible screen, said screen having a transversal edge connected to the beam and having opposed lateral screen parts biased in a lateral direction, wherein at least one of said lateral screen parts is configured to adjustably fold around the folding member through an angle of substantially 180° along at least a part of the length of the corresponding longitudinal edge of the sunshade assembly.

6. The sunshade assembly according to claim 5, and further comprising a biasing element coupled to at least one of the lateral screen parts and configured to bias the lateral screen part toward the longitudinal edge that is opposite the lateral screen part.

7. The sunshade assembly according to claim 6, wherein the biasing element comprises an elastic member connected on its first end to one of the lateral screen parts, and on its second end to at least one of: the flexible screen, the center member, and the beam.

8. The sunshade assembly according to claim 1, wherein that an area of the folding member, about which the cloth is folded, is covered with a friction reducing coating.

9. The sunshade assembly according to claim 2, and further comprising a flexible sleeve surrounding said folding member.

10. The sunshade assembly according to claim 1, wherein that the lateral screen parts of the screen are made of a material different from the material of the screen.

11. The sunshade assembly according to claim 10, wherein at least a substantial part of the lateral screen parts is made of an elastic material.

12. The sunshade assembly according to claim 11, wherein that the lateral screen parts are connected to at least one of: the upper surface of the screen and the center member.

13. A sunshade assembly comprising:
non parallel guide rails;
rotatable winding shaft;
a beam configured to move longitudinally along the guide rails;
a folding member;
a biasing element; and
a flexible screen comprising:
 a first transversal edge being connected to the rotatable winding shaft configured for winding and unwinding said flexible screen;
 a second transversal edge, opposite the first transversal edge, being connected to the beam for tensioning said flexible screen in a longitudinal direction; and
 first and second lateral screen parts forming first and second opposed longitudinal edges of the flexible screen that are guided in the non parallel guide rails, wherein the first lateral screen part is wrapped at least partially around the folding member and biased, by the biasing element, in a lateral direction away from the folding member to move the first lateral screen part at least partially around the folding member as the flexible screen moves with at least some longitudinal movement of the beam along the guide rails.

14. A sunshade assembly comprising:
a pair of opposed non parallel guides;
a sunshade having opposed longitudinal edges and opposed transversal edges, said sunshade comprising a center member, a beam connected to said center member and two opposed lateral members, said lateral members being pivotally connected to the center member in the area near a first transversal edge of the sunshade in order to move in a lateral direction and adapt to the non-parallel guides, and being connected to respective guiding members near a second transversal edge, a flexible screen being fixedly connected to the center member, said screen having opposed lateral screen parts biased in a lateral direction wherein at least one of said lateral screen parts is configured to adjustably fold around the lateral member through an angle of substantially 180° along at least a part of the length of the corresponding longitudinal edge of said sunshade.

15. An open roof construction for a vehicle, comprising:
a roof opening in a stationary roof part, and a movable closure, wherein below said roof opening there is provided a sunshade assembly according to claim 1.

16. The sunshade assembly of claim 1, and wherein the biasing element is coupled to the lateral screen parts and configured to bias ends of the lateral screen parts toward each other.

17. The sunshade assembly of claim 1, wherein the biasing element comprises at least one elastic member connected on its first end to one of the lateral screen parts, and on its second end to the flexible screen.

18. The sunshade assembly of claim 13, wherein the second lateral screen part is wrapped at least partially around a second folding member and biased in a lateral direction away from the second folding member to move the second lateral screen part at least partially around the second folding member as the flexible screen moves with at least some longitudinal movement of the beam along the guide rails.

19. The sunshade assembly of claim 18, wherein the biasing element is connected to the first lateral screen part, and further comprising a second biasing element connected to the second lateral screen part.

20. The sunshade assembly of claim 18, wherein the biasing element is coupled to both the first and second lateral screen parts and biases the lateral screen parts toward each other.

21. The sunshade assembly of claim 1, wherein the biasing element comprises at least one elastic member connected on its first end to one of the lateral screen parts, and on its second end to a center member.

22. The sunshade assembly of claim 1, wherein the biasing element comprises at least one elastic member connected on its first end to one of the lateral screen parts, and on its second end to the beam.

* * * * *